United States Patent
Ozaki et al.

(10) Patent No.: US 6,268,964 B1
(45) Date of Patent: Jul. 31, 2001

(54) STEP ZOOM LENS

(75) Inventors: Hiroyasu Ozaki, Tokyo; Takayuki Ito, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,296

(22) Filed: Jun. 24, 1999

(30) Foreign Application Priority Data

Jun. 26, 1998 (JP) ................................................. 10-181031

(51) Int. Cl.$^7$ .................................................. G02B 15/14
(52) U.S. Cl. ........................... 359/685; 359/682; 359/691
(58) Field of Search .................................... 359/721, 685, 359/680, 681, 682, 676, 689, 691; 396/79, 80, 82

(56) References Cited

U.S. PATENT DOCUMENTS 4,963,005 * 10/1990 Tsjui ..................................... 359/680

* cited by examiner

Primary Examiner—Georgia Epps
Assistant Examiner—David N. Spector
(74) Attorney, Agent, or Firm—Greenblum & Bernstein P.L.C.

(57) ABSTRACT

A step zoom lens includes a first movable lens group of negative power, a diaphragm which is immovable during zooming, and a second lens group of positive power. A fundamental zooming path along which the first lens group is moved to vary a focal length without causing an image shift is defined so that the distance of the first lens group from the diaphragm is reduced and is thereafter increased, upon zooming from a wide angle extremity to a telephoto extremity, and a fundamental zooming path along which the second lens group is moved is defined so that the distance of the second lens group from the diaphragm is linearly varied. The discrete stop positions of the first and second lens groups are determined to be different from a focal length position at which the distance between the first lens group and the diaphragm on the fundamental zooming path thereof is minimum or the vicinity thereof.

14 Claims, 3 Drawing Sheets

STEP ZOOM LENS

BACKGROUND OF THE INVENTION

1. Field of the Invention

The present invention relates to a zoom lens for a digital camera, a video camera or a compact camera.

2. Description of the Related Art

In general, in a zoom lens, the focal length can be continuously varied by moving movable variable power lens groups (a plurality of lens groups which move along the optical axis upon zooming) in a stepless fashion. In a single lens reflex camera in which an object image formed by a photographing lens system is viewed through a view finder, it is preferable to be able to stop the variable power lens groups at a desired position. In a single lens reflex camera in which the focal length of the photographing lens is detected electrically and is used to control predetermined operations, it is possible to mechanically stop the variable power lens groups at a desired focal length position so as to prevent the object image from appearing unnatural due to the discontinuous zooming operation. Furthermore, the focal lengths can be detected stepwise at practical intervals, and can be used to control a predetermined operation. Namely, the function of stopping the variable power lens groups itself at a desired position is a different matter not to be confused with the stepwise detection of the focal length.

In a digital camera, video camera or compact camera, in which an image other than an image formed by a photographing optical system is viewed through a finder optical system, the stepless stoppage of the variable power lens groups in the finder optical system has less merit. Therefore, the variable power lens groups are stopped stepwise and the focal length is detected stepwise.

SUMMARY OF THE INVENTION

It is an object of the present invention to provide a small zoom lens (hereinafter termed as a step zoom lens) having a specific fundamental zooming path which is carried out in a stepwise (discontinuous) fashion, and wherein a sufficient space can be provided around a diaphragm in the optical axis direction (i.e., in front or behind the diaphragm).

According to the present invention, there is provided a step zoom lens comprising a first movable lens group having negative refracting power, a diaphragm which is immovable during zooming, and a second movable lens group having positive refracting power, in this order from the object side; wherein: a fundamental zooming path along which the first lens group is moved to vary a focal length without causing an image shift is defined so that the distance of the first lens group from the diaphragm is reduced and is thereafter increased, and a fundamental zooming path along which the second lens group is moved is defined so that the distance of the second lens group from the diaphragm is linearly varied, upon zooming from a wide angle extremity to a telephoto extremity; and the first and second lens groups are stopped stepwise on the respective fundamental zooming paths to constitute a step zoom, and wherein the discrete stop positions of the first lens groups are determined to be different from a focal length position at which the distance between the first lens group and the diaphragm on the the fundamental zooming path thereof is at a minimum or at a near minimum.

Preferably, at least two discrete stop positions of the first lens group are located on opposite sides of an apex of the fundamental zooming path thereof, wherein the distance between the first lens group and the diaphragm is at a minimum.

Preferably, the stop positions of the first lens group located on opposite sides of the apex are identical.

Alternatively, a third lens group can be further provided which is immovable during the zooming operation, the third lens group being located between the second lens group and the image surface.

Preferably, the discrete stop positions are set so that each displacement of the second lens group upon zooming is identical.

Preferably, the discrete stop positions are set so that the displacement of the second lens group upon zooming is an integer which is a multiple of the minimum displacement of the second lens group.

The present disclosure relates to subject matter contained in Japanese Patent Application No. 10-181031 (filed on Jun. 26, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
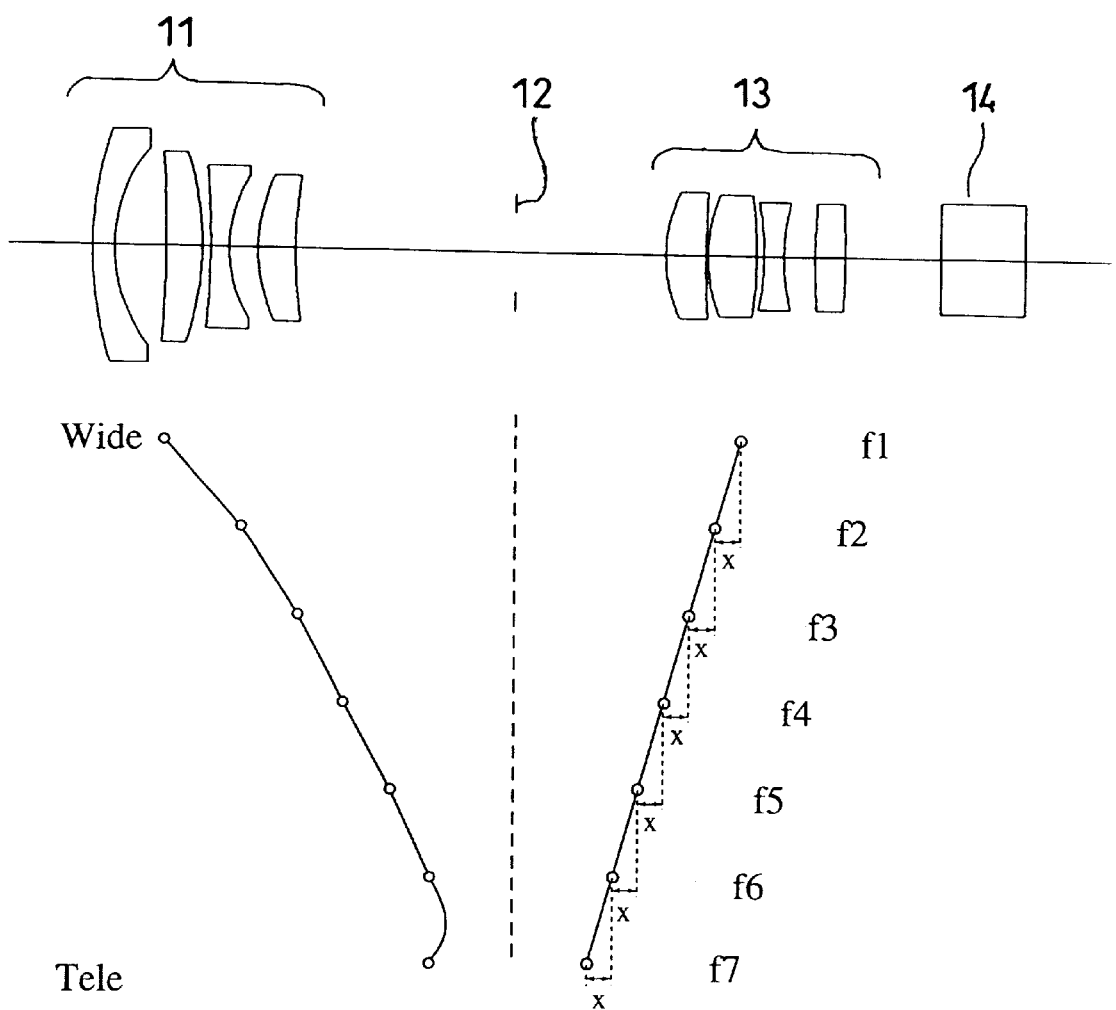
FIG. 1 is a schematic drawing showing a lens arrangement of a step zoom lens and the fundamental zooming paths according to a first embodiment of the present invention.

FIG. 1 shows a first embodiment of a step zoom lens according to the present invention. Tables 1 and 2 show lens data thereof. A lens system of the first embodiment includes a first lens group 11 of negative refracting power, a diaphragm (stop) 12, and a second lens group 13 of positive refracting power, in this order from the object side. During the zooming operation, the first and second lens groups 11 and 13 are movable along the optical axis, and the diaphragm 12 remains at a stationary position. A plane-parallel plate 14, such as a filter, is provided in front of an image surface (CCD). In Table 2, R designates the radius of curvature, D designates the lens thickness or distance, Nd designates the refractive index with respect to d-line, and vd designates the Abbe number.

The fundamental zooming paths of the movement of the first and second lens groups 11 and 13 to provide a step zoom (i.e., the fundamental paths of the first and second lens groups 11 and 13 to vary the focal length without changing the image position (without causing the image shift), are shown in a lower part of FIG. 1. The fundamental zooming path of the first lens group 11 is such that the distance between the first lens group 11 and the diaphragm 12 is first decreased and is thereafter increased, upon zooming from the wide angle extremity to the telephoto extremity. Namely, the curve representing the fundamental zooming path of the first lens group 11 is closest to the diaphragm 12 at an apex and the distance from the diaphragm is increased on opposite sides of the apex. The fundamental zooming path of the second lens group 13 is linear so that the distance from the diaphragm 12 is gradually decreased, upon zooming from the wide angle extremity to the telephoto extremity. The reason why the term 'fundamental' is added to the term 'path' is because the first or second lens group 11 or 13 is not always moved (is not forced to move) on or along the fundamental path which is used to specify the stop position thereof in a stepwise fashion.

The stop positions of the first and second lens groups 11 and 13 are restricted in the first embodiment in order to miniaturize the step zoom lens (which includes the first and second lens groups having the above-mentioned fundamental zooming paths and the stationary diaphragm 12) and to provide a sufficient space around the diaphragm 12 in the optical axis direction. Namely, the stop positions of the first and second lens groups 11 and 13 are set to be different from those corresponding to the focal length at which the distance between the first and second lens groups 11 and 13 is at a minimum or at a near minimum. Consequently, not only can the whole lens length be reduced, but also a sufficient space can be provided around the diaphragm 12 in the optical axis direction, so that a diaphragm mechanism and a filter, etc., can be easily incorporated.

Looking at FIG. 1, there are seven focal length steps (stop positions), i.e., f1, f2, f3, f4, f5, f6 and f7, between the wide angle extremity and the telephoto extremity (both extremities inclusive). In this embodiment, the focal length steps f6 and f7 are located on opposite sides of the apex of the fundamental path of the first lens group 11, and furthermore, the stop positions of the first lens group 11 at f6 and f7 are identical. As can be seen from FIG. 1 and Table 2, the focal length steps are set so that each displacement of the second lens group 13 upon zooming is identical. Consequently, the pitch of the focal length steps is identical, and hence, facilitating the control of the movement of the second lens group 13.

Table 2 shows the F-number $F_{NO}$, focal length f, half angle-of-view W (°), and distances D8, DS and D16 between lenses, at each focal length step.

The shape of the rotationally symmetrical aspherical surface is expressed by;

$$x = cy^2/\{1+[1-(1+K)c^2y^2]^{1/2}\} + A4y^4 + A6y^6 + A8y^8 + A10y^{10} + A12y^{12}$$

Wherein:

x designates a distance from a tangent plane of an aspherical vertex;

c designates a curvature (1/R);

y designates a distance from the optical axis;

K designates the conic coefficient;

A4, A6, A8, A10 . . . designate an aspherical coefficient at each order, respectively.

TABLE 1

| surface No. | R | D | Nd | vd |
|---|---|---|---|---|
| 1 | 23.001 | 1.300 | 1.83481 | 42.7 |
| 2 | 9.519 | 3.064 | — | — |
| 3 | −78.783 | 2.111 | 1.80518 | 25.4 |
| 4 | −18.069 | 0.500 | — | — |
| 5 | −50.606 | 1.100 | 1.83400 | 37.2 |
| 6 | 8.208 | 1.724 | — | — |
| 7 | 10.277 | 2.200 | 1.80518 | 25.4 |
| 8 | 28.368 | D8 | — | — |
| stop | ∞ | DS | — | — |
| 9 | 8.837 | 2.391 | 1.65160 | 58.5 |
| 10 | 66.089 | 0.123 | — | — |
| 11 | 10.132 | 2.892 | 1.58913 | 61.2 |
| 12 | −26.075 | 0.438 | — | — |
| 13 | −16.474 | 1.200 | 1.80518 | 25.4 |

TABLE 1-continued

| surface No. | R | D | Nd | vd |
|---|---|---|---|---|
| 14 | 12.656 | 1.875 | — | — |
| 15 | 23.608 | 1.827 | 1.66910 | 55.4 |
| 16 | −53.449 | D16 | — | — |
| 17 | ∞ | 5.000 | 1.51633 | 64.1 |
| 18 | ∞ | — | — | — |

The symbol * designates a rotationally symmetrical aspherical surface.

Aspherical surface data (the aspherical surface coefficients not indicated are zero (0.00)):

| surface No. | K | A4 | A6 | A8 |
|---|---|---|---|---|
| 15 | 0.00 | $-0.7345 \times 10^{-3}$ | $-0.1270 \times 10^{-4}$ | $-0.2706 \times 10^{-6}$ |

Table 2

$F_{NO}$=1:2.8~3.1~3.3~3.7~4.1~4.5~5.1 f=5.28~6.65~8.02~9.39~10.76~12.13~13.50

W=33.4~27.2~22.8~19.6~17.2~15.3~13.8

D8=13.016~8.282~5.607~4.090~3.288~2.959~2.959

DS=8.990~7.698~6.406~5.114~3.822~2.530~1.238

D16=5.752~7.044~8.336~9.628~10.920~12.212~13.504

Figure 2:
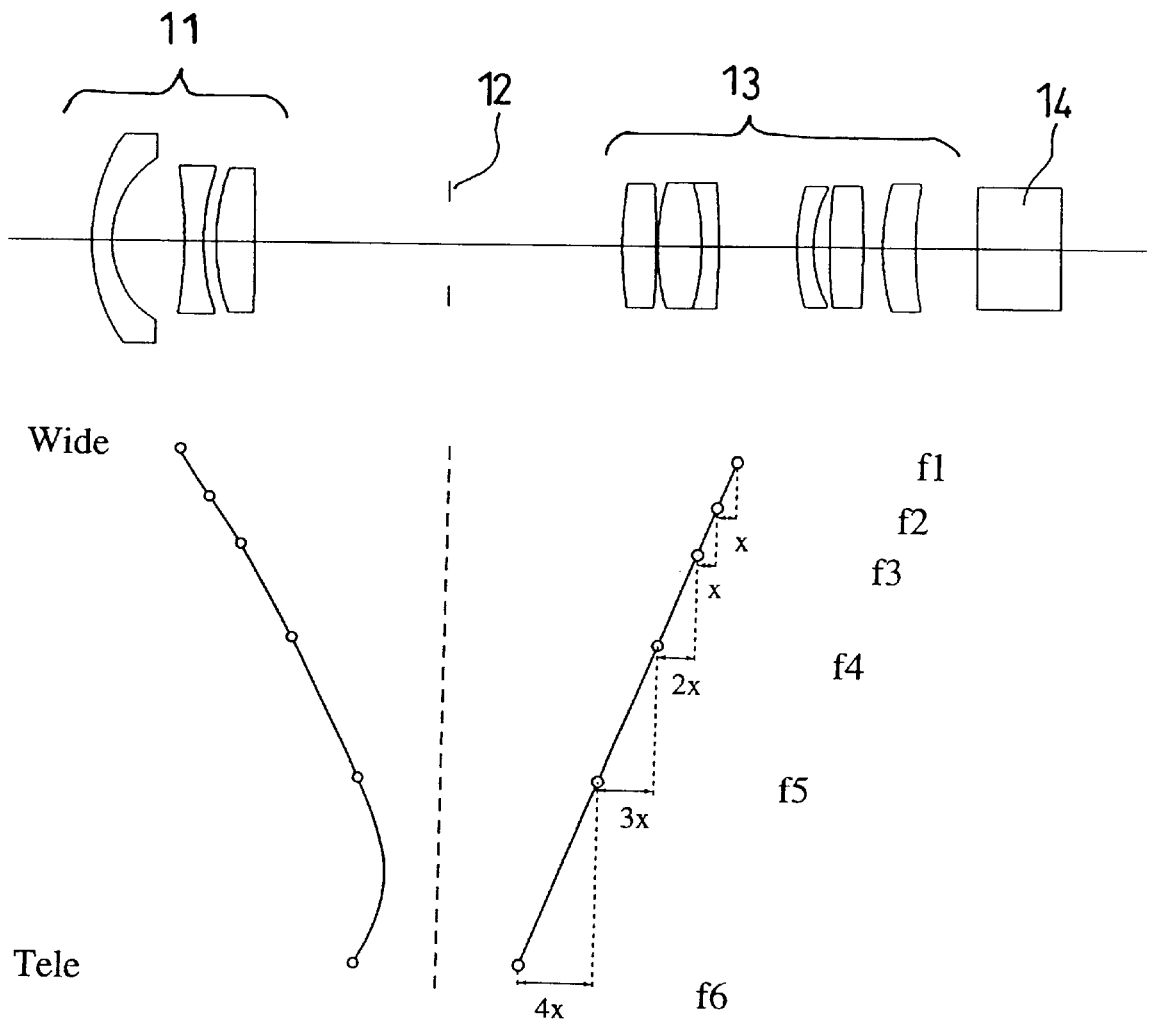
FIG. 2 is a schematic drawing showing a lens arrangement of a step zoom lens and the fundamental zooming paths according to a second embodiment of the present invention; and, FIG. 3 is a schematic drawing showing a lens arrangement of a step zoom lens and the fundamental zooming paths according to a third embodiment of the present invention.

FIG. 2 shows a second embodiment of a step zoom lens according to the present invention. Tables 3 and 4 show lens data thereof. The lens elements of each lens group in the second embodiment are different from those of the first embodiment; however, the fundamental lens system arrangement is the same as the first embodiment, i.e., includes a first lens group 11 of negative refracting power, a diaphragm (stop) 12, and a second lens group 13 of positive refracting power, in this order from the object side. During the zooming operation, the first and second lens groups 11 and 13 are movable and the diaphragm 12 remains at a stationary position. The plane-parallel plate 14 is disposed in front of the image surface.

The fundamental zooming paths of the first and second lens groups 11 and 13 to carry out a step zooming operation are the same as those of the first embodiment. Similar to the first embodiment, the stop positions of the first and second lens groups 11 and 13 are set to be different from those corresponding to the focal length at which the distance between the first and second lens groups 11 and 13 is at a minimum or at a near minimum.

In the second embodiment, there are six focal length steps (stop positions), i.e., f1, f2, f3, f4, f5 and f6, between the wide angle extremity and the telephoto extremity (both extremities inclusive). The focal length steps f5 and f6 are located on opposite sides of the apex of the fundamental path of the first lens group 11, and further the stop positions of the first lens group 11 at f6 and f7 are identical. As can be seen from FIG. 2 and Table 4, the focal length steps are set so that the displacement of the second lens group 13 upon zooming is an integer which is a multiple (nx [n=1, 2, . . . ]) of the minimum displacement (x) of the second lens group 13 in the optical axis direction. Consequently, the control of the movement of the second lens group 13 can be simplified.

TABLE 3

| Surface No. | R | D | Nd | vd |
|---|---|---|---|---|
| 1* | 12.093 | 1.200 | 1.66910 | 55.4 |
| 2 | 5.738 | 4.381 | — | — |
| 3 | −27.439 | 1.100 | 1.83400 | 37.2 |
| 4 | 13.687 | 0.748 | — | — |
| 5 | 13.013 | 2.305 | 1.80518 | 25.4 |
| 6 | −162.028 | D6 | — | — |
| stop | ∞ | DS | — | — |
| 7 | 23.881 | 2.004 | 1.81600 | 46.6 |
| 8 | −55.291 | 0.100 | — | — |
| 9 | 13.847 | 2.600 | 1.48749 | 70.2 |
| 10 | −13.847 | 1.000 | 1.80518 | 25.4 |
| 11 | −53.397 | 4.678 | — | — |
| 12 | 13.711 | 1.000 | 1.84666 | 23.8 |
| 13 | 7.373 | 0.991 | — | — |
| 14 | 30.093 | 2.000 | 1.61772 | 49.8 |
| 15 | −78.471 | 1.182 | — | — |
| 16 | 13.391 | 2.000 | 1.83481 | 42.7 |
| 17 | 21.092 | D17 | — | — |
| 18 | ∞ | 5.000 | 1.51633 | 64.1 |
| 19 | ∞ | — | — | — |

The symbol * designates a rotationally symmetrical aspherical surface.

Aspherical surface data (the aspherical surface coefficients not indicated are zero (0.00)):

| Surface No. | K | A4 | A6 | A8 |
|---|---|---|---|---|
| 1 | 0.00 | $0.9806 \times 10^{-4}$ | $0.6760 \times 10^{-6}$ | $0.1711 \times 10^{-7}$ |

Table 4

$F_{NO}$=1:2.8~3.03.1~3.4~4.0~5.2
f=5.76~6.58~7.39~9.03~11.48~14.75
W=33.3~29.6~26.6~22.1~17.6~13.8
D6=12.201~9.247~7.135~4.519~2.900~2.900
DS=10.453~9.603~8.753~7.052~4.501~1.100
D17=3.646~4.496~5.346~7.047~9.598~12.999

Figure 3:
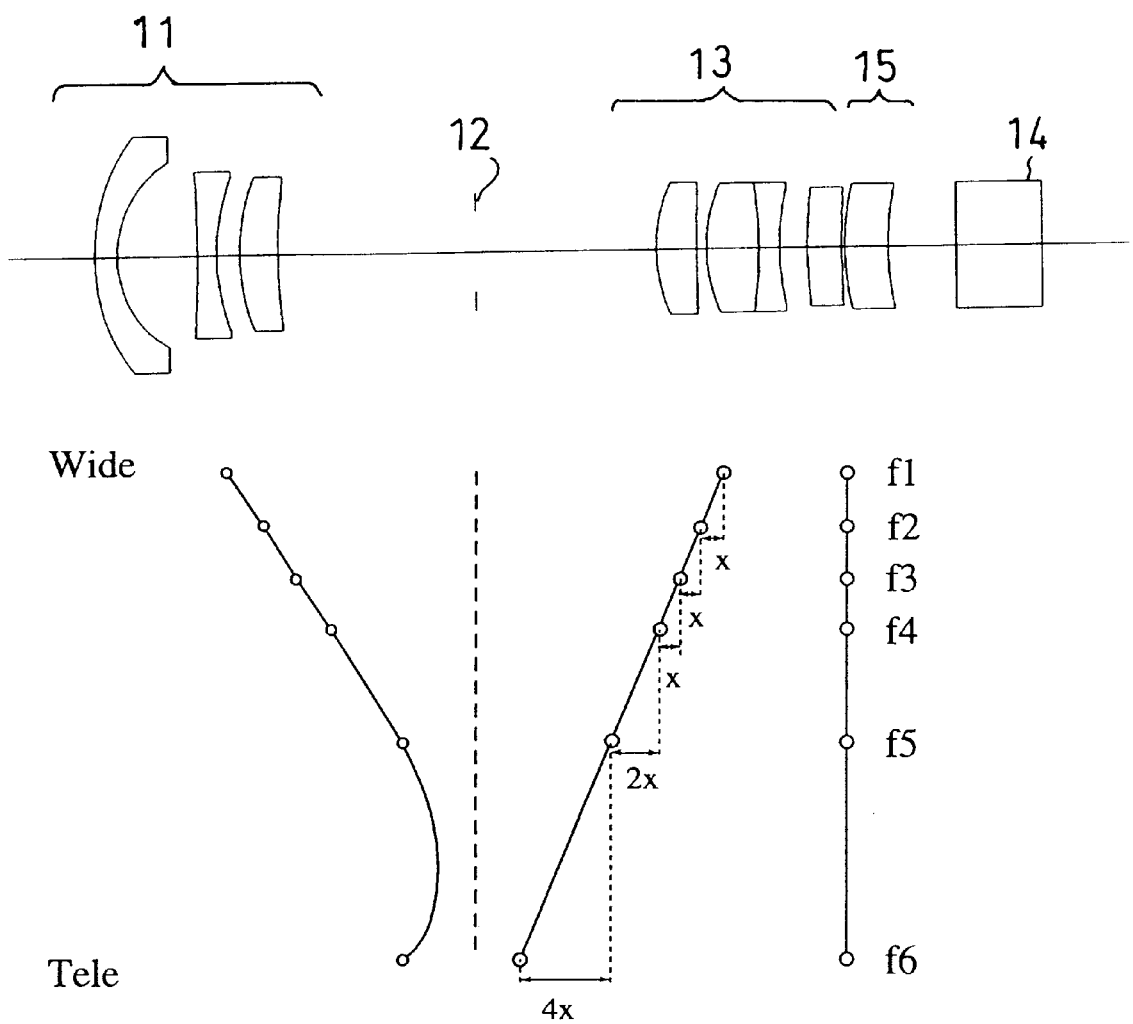

FIG. 3 shows a third embodiment of a step zoom lens according to the present invention. Tables 5 and 6 show lens data thereof. Unlike the first or second embodiment, a third lens group 15 is provided in front of the plane-parallel plate 14 which is in turn provided in front of the image surface. Namely, the lens system includes a first lens group 11 of negative refracting power, a diaphragm 12, a second lens group 13 of positive refracting power, and a third lens group 15 of positive refracting power, in this order from the object side. During the zooming operation, the first and second lens groups 11 and 13 are movable, and the diaphragm 12 and the third lens group 15 are stationary. The third lens group 15 can be either a positive lens or a negative lens. As can be seen from FIG. 3 and Table 6, as in the second embodiment, the focal length steps are set so that the displacement of the second lens group 13 upon zooming is an integer which is a multiple (nx [n=1, 2, . . . ]) of the minimum displacement (x) of the second lens group 13 in the optical axis direction. Consequently, the control of the movement of the second lens group 13 can be simplified.

TABLE 5

| Surface No. | R | D | Nd | vd |
|---|---|---|---|---|
| 1* | 12.356 | 1.300 | 1.66910 | 55.4 |
| 2 | 6.250 | 4.622 | — | — |
| 3 | −70.102 | 1.100 | 1.72000 | 50.2 |
| 4 | 12.351 | 1.328 | — | — |
| 5 | 11.946 | 2.200 | 1.80518 | 25.4 |
| 6 | 34.386 | D6 | — | — |
| stop | ∞ | DS | — | — |
| 7 | 8.937 | 2.341 | 1.58913 | 61.2 |
| 8 | 109.840 | 0.582 | — | — |
| 9 | 9.247 | 3.000 | 1.48749 | 70.2 |
| 10 | −26.849 | 1.200 | 1.80518 | 25.4 |
| 11 | 14.316 | 1.635 | — | — |
| 12* | 19.132 | 2.000 | 1.66910 | 55.4 |
| 13 | 62.488 | D13 | — | — |
| 14 | 15.870 | 2.500 | 1.74077 | 27.8 |
| 15 | 16.617 | 4.001 | — | — |
| 16 | ∞ | 5.000 | 1.51633 | 64.1 |
| 17 | ∞ | — | — | — |

The symbol * designates a rotationally symmetrical aspherical surface.

Aspherical surface data (the aspherical surface coefficients not indicated are zero (0.00)):

| Surface No. | K | A4 | A6 | A8 |
|---|---|---|---|---|
| 1 | 0.00 | $0.6085 \times 10^{-4}$ | $0.4954 \times 10^{-6}$ | $0.9721 \times 10^{-8}$ |
| 12 | 0.00 | $-0.7024 \times 10^{-3}$ | $-0.8844 \times 10^{-5}$ | $-0.3487 \times 10^{-6}$ |

Table 6

$F_{NO}$=1:2.8~3.0~3.2~3.4~3.9~5.4
f=5.60~6.62~7.64~8.65~10.69~14.75
W=34.3~29.5~25.9~23.0~18.8~13.8
D6=11.379~8.038~5.862~4.439~2.991~2.991
DS=10.246~9.218~8.190~7.163~5.108~0.998
D13=0.200~1.228~2.255~3.282~5.338~9.448

As may be understood from the above discussion, according to the present invention, a step zoom lens is applied to a zoom lens in which the fundamental zooming path of the first lens group is determined so that the distance of the first lens group from the diaphragm is first reduced and thereafter is increased, upon zooming from the wide angle extremity to the telephoto extremity. Consequently, not only can the step zoom lens be made small, but also a sufficient space can be provided around the diaphragm in the optical axis direction.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A step zoom lens comprising a first movable lens group having negative refracting power, a diaphragm which is immovable during zooming, and a second movable lens group having positive refracting power, in this order from the object side; wherein:

a fundamental zooming path along which the first lens group is moved to vary a focal length without causing an image shift is defined so that the distance of the first lens group from the diaphragm is reduced and is thereafter increased, and a fundamental zooming path along which the second lens group is moved is defined so that the distance of the second lens group from the diaphragm is linearly varied, upon zooming from a wide angle extremity to a telephone extremity; and said first and second lens groups are stopped stepwise on the respective fundamental zooming paths to constitute a step zoom, and wherein the discrete stop positions of the first lens groups are determined to exclude a focal length position at which the distance between the first lens group and the diaphragm on the fundamental zooming path thereof is in a vicinity of a minimum.

2. A step zoom lens according to claim 1, wherein at least two discrete stop positions of the first lens group are located on opposite sides of an apex of the fundamental zooming path thereof, wherein the distance between the first lens group and the diaphragm is at a minimum.

3. A step zoom lens according to claim 2, wherein the stop positions of the first lens group located on opposite sides of the apex are identical.

4. A step zoom lens according to claim 1, further comprising a third lens group which is immovable during the zooming operation, said third lens group being located between the second lens group and the image surface.

5. A step zoom lens according to claim 1, wherein the discrete stop positions are set so that each displacement of the second lens group upon zooming is identical.

6. A step zoom lens according to claim 1, wherein the discrete stop positions are set so that the displacement of the second lens group upon zooming is an integer which is a multiple of the minimum displacement of the second lens group.

7. A step zoom lens comprising a first movable lens group having a negative refracting power, a diaphragm which is immovable during zooming, and a second movable lens group having a positive refracting power, in this order from the object side, wherein:

said first lens group being moved along a fundamental zooming path to vary a focal length without causing an image shift, such that the distance between the first lens group and the diaphragm is reduced and is then increased, said second lens group being moved along a fundamental zooming path such that the distance between the second lens group and the diaphragm is varied linearly upon zooming from a wide angle extremity to a telephoto extremity;

said first and second lens groups are stopped stepwise on the respective fundamental zooming paths to constitute a step zoom, and wherein the discrete stop positions of the first lens groups are determined to exclude a focal length position at which the distance between the first lens group and the diaphragm on the fundamental zooming path is in a vicinity of a minimum distance; and the discrete stop positions of the first lens group on opposite sides of the minimum distance are identical.

8. The step zoom lens according to claim 1, wherein at least four step zoom positions are provided.

9. A step zoom lens comprising a first movable lens group having a negative refracting power, a diaphragm which is immovable during zooming, and a second movable lens group having a positive refracting power in this order from the object side;

the first lens group being movable to vary a focal length without causing an image shift along a fundamental zooming path such that the distance between the first lens group with respect to the diaphragm is reduced and then increased, the second lens group being movable along a fundamental zooming path such that the distance between the second lens group and the diaphragm varies linearly, upon zooming from a wide angle extremity to a telephoto extremity; and said first and second lens groups are movable along a zooming range having telephoto and wide angle extremities and are stoppable at a plurality of predetermined step zoom positions within the range between the telephoto and wide angle extremities, the predetermined step zoom positions of the first lens group excluding a focal length position at which the distance between the first lens group and the diaphragm along the fundamental zooming path is in a vicinity of a minimum distance.

10. The step zoom lens according to claim 9, wherein at least two discrete stop positions of the first lens group are located on opposite sides of an apex of the fundamental zooming path of the first lens group, the distance between the first lens group and the diaphragm being a minimum at the apex.

11. The step zoom lens according to claim 10, wherein the discrete stop positions of the first lens group on opposite sides of the apex are equidistant from the apex.

12. The step zoom lens according to claim 9, further comprising a third lens group which is immovable during zooming, said third lens group being located between the second lens group and an image surface.

13. The step zoom lens according to claim 9, wherein the discrete stop positions are predetermined so that each displacement of the second lens group during zooming is identical.

14. The step zoom lens according to claim 9, wherein the discrete stop positions are predetermined such that the displacement of the second lens group during zooming is an integral multiple of the minimum displacement of the second lens group.

* * * * *